(12) United States Patent
Yu et al.

(10) Patent No.: US 11,409,570 B2
(45) Date of Patent: Aug. 9, 2022

(54) DYNAMIC MANAGEMENT OF SYSTEM COMPUTING RESOURCES

(71) Applicant: SAP SE, Walldorf (DE)

(72) Inventors: Xia Yu, Shanghai (CN); Wanshun Zhang, Shanghai (CN); Dabin Feng, Shanghai (CN)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 17/083,036

(22) Filed: Oct. 28, 2020

(65) Prior Publication Data

US 2022/0129314 A1  Apr. 28, 2022

(51) Int. Cl.
*G06F 9/50* (2006.01)
*G06F 11/34* (2006.01)

(52) U.S. Cl.
CPC .......... *G06F 9/505* (2013.01); *G06F 9/5077* (2013.01); *G06F 9/5083* (2013.01); *G06F 11/3428* (2013.01); *G06F 2209/5011* (2013.01)

(58) Field of Classification Search
CPC ...... G06F 9/505; G06F 9/5077; G06F 9/5083; G06F 11/3428; G06F 2209/5011
See application file for complete search history.

(56) References Cited

U.S. PATENT DOCUMENTS

| | | | |
|---|---|---|---|
| 10,511,481 B1* | 12/2019 | Castellanos | G06F 8/60 |
| 2020/0382380 A1* | 12/2020 | Sundaram | H04L 47/70 |
| 2020/0409781 A1* | 12/2020 | Zhen | G06F 11/3006 |
| 2021/0126964 A1* | 4/2021 | Obembe | G06F 11/0793 |
| 2021/0182046 A1* | 6/2021 | Paralikar | G06Q 10/1097 |
| 2021/0234919 A1* | 7/2021 | Paralikar | H04L 67/125 |
| 2022/0058103 A1* | 2/2022 | Orndorf | G06F 11/3438 |

\* cited by examiner

*Primary Examiner* — Sisley N Kim
(74) *Attorney, Agent, or Firm* — Fountainhead Law Group P.C.

(57) ABSTRACT

System computing resources are dynamically managed by a resource management layer together with resource server pool. A group monitor collects data of server operation (e.g., CPU usage, memory consumption, queue size) in a particular group (e.g., customer-facing servers, job servers). The group monitor: calculates a weighted score for each server, sorts the scores of each server, maintains a sequence of scores, and periodically reports the score list to a resource manager. When an incoming request is directed to a particular server group, the group monitor redirects the request to a lowest-scoring server, and recalculates/sorts the score list. The resource manager monitors and throttles the servers in each group. Where servers in a group are experiencing high workload, the manager adds to the group server(s) from the resource pool. Conversely, where server group members are experiencing a low workload, the manager removes the lowest scoring server(s) to the resource pool.

20 Claims, 7 Drawing Sheets

DYNAMIC MANAGEMENT OF SYSTEM COMPUTING RESOURCES

BACKGROUND

Unless otherwise indicated herein, the approaches described in this section are not prior art to the claims in this application and are not admitted to be prior art by inclusion in this section.

With the advent of high communications bandwidth and fast data handling, computer software services are increasingly deployed on cloud systems physically located on remote servers. Accordingly, access to such application servers is a precious and expensive commodity.

However, such remote server environments can be subject to load distribution issues that can affect their efficiencies. For example, some servers may be burdened with a high workload resulting in long response times, while other servers are nearly idle. Such imbalances can impose undue stresses on remote server environments, wasting resources and escalating cost.

SUMMARY

Embodiments implement a resource management layer together with resource pool, in order to dynamically manage system computing resources. A group monitor of the resource management layer collects data (e.g., CPU usage, memory consumption, others) of server operation in a particular group (e.g., customer-facing servers, job servers, others). The group monitor calculates a score for each server of a particular group, according to weights that are assigned by a user.

The group monitor sorts the scores of each server in the group, and maintains a list with the sequence of scores. The group monitor periodically reports the score list to a resource manager of resource layer.

When a load balancer directs an incoming request to a particular server group, the monitor redirects the request to a lowest-scoring server, and recalculates/sorts the score list.

The resource manager monitors and throttles the servers in each group. Where most of the servers in a particular group are experiencing a high workload lying above a specified tolerance range, the resource manager will add to the group server(s) from an idle server resource pool. Conversely, where members of a particular server group are experiencing a low workload lying below the specified tolerance range, the resource manager will remove the lowest scoring server(s) to the idle server resource pool. Such dynamic addition to (and removal from) the idle server resource pool, ensures the efficient consumption of server resources by the system.

The following detailed description and accompanying drawings provide a better understanding of the nature and advantages of various embodiments.

DETAILED DESCRIPTION

Described herein are methods and apparatuses that implement dynamic management of computing resources. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
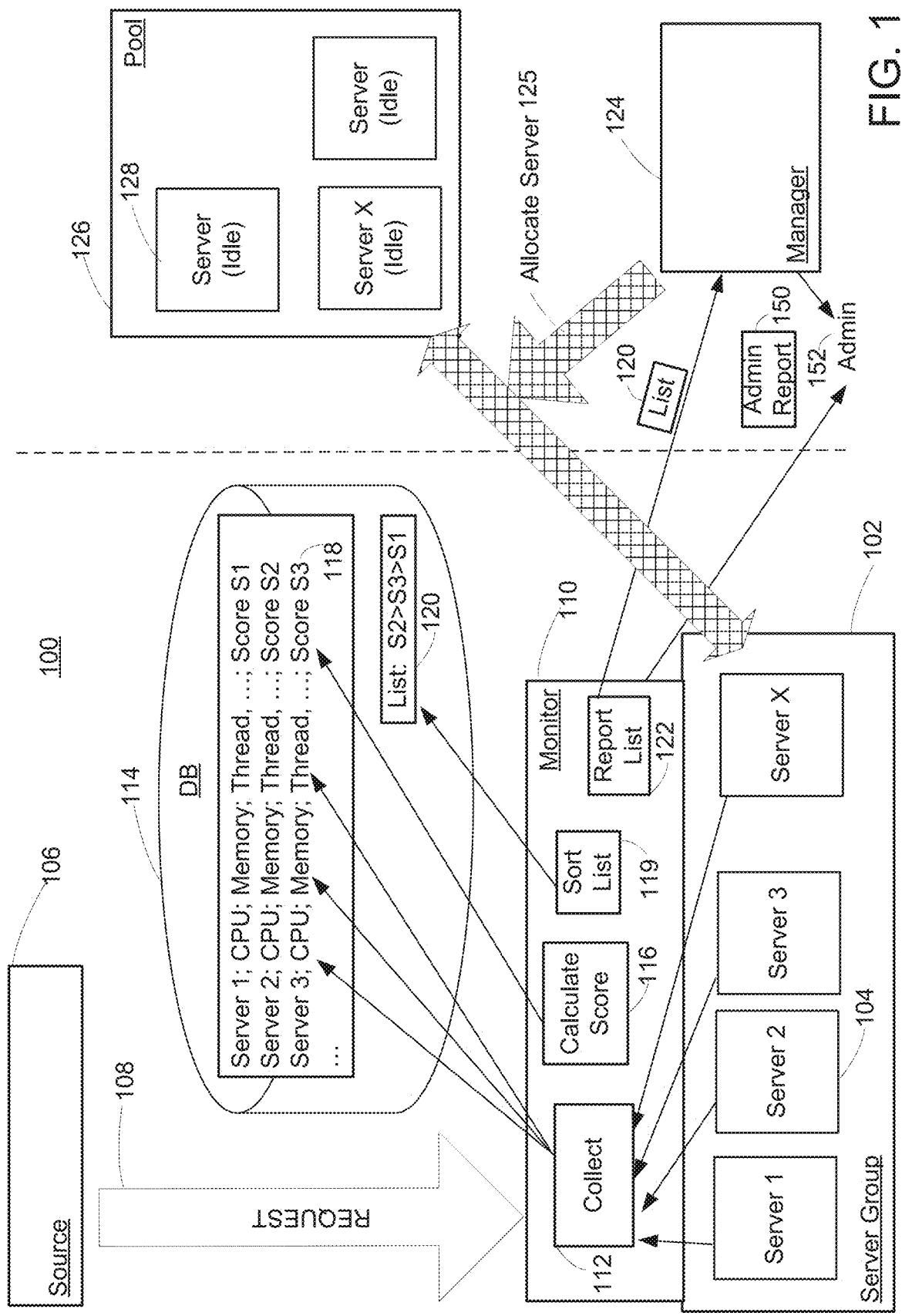
FIG. 1 shows a simplified diagram of a system according to an embodiment.

FIG. 1 shows a simplified view of an example system that is configured to implement dynamic management of computing resources according to an embodiment. Specifically, system 100 comprises server group 102 comprising a plurality of servers 104.

The server group is dedicated toward handling particular types requests, e.g., an Application Programming Interface (API) server group. In particular a source 106 (e.g., load balancer) is responsible for directing requests 108 to the server group.

The system further comprises a monitor engine 110 that is in communication with the servers of the server group. The monitor is configured to collect 112 various types of performance data from each server. The timing of this collection may be based upon receipt of a request. Alternatively, the timing of the performance data collection may occur at regular intervals based upon a collecting period. Examples of performance data types can include CPU usage, memory usage, thread count, queue length, and others. The monitor engine stores the performance data in a database 114, e.g., as may be present in a non-transitory computer readable medium.

Next, from the performance data, the monitoring engine is configured to calculate 116 scores for each of the servers in the group. Those scores 118 are stored in the database associated with the performance data and the corresponding server.

Then, the monitoring engine is configured to generate and sort 119 a list 120 of the different scores. For example, this sorting may result in a list of scores from highest to lowest.

The monitoring engine then reports 122 the list to a manager component 124.

The manager component receives the list. Then, based upon comparison of the scores to a tolerance level, the manager determines whether any member servers of the group are either under-utilized, or working at or above their capacities.

Based upon this determination, the manager then allocates 125 servers (e.g., Server X) to or from a resource pool 126. That is, the resource pool contains idle servers 128, which can be allocated to reduce the load on servers of the group operating at or near their capacities.

Alternatively, based upon the manager's determination according to the scores in the list, group servers operating below a tolerance range, can be allocated back to the resource pool. This can place the resource pool in better situation to then allocate its idle servers to meet the current needs of other groups, and/or to meet the future needs of the instant server group.

It is noted that further actions are possible. For example, an administration report 150 may be generated and communicated to a human administrator 152. The administration report could be generated by the monitor component or by the manager component. Performance data contained within the administration report could allow the administrator to review how the system is operating, and possibly adjust the weights in order to achieve better performance.

Figure 2:
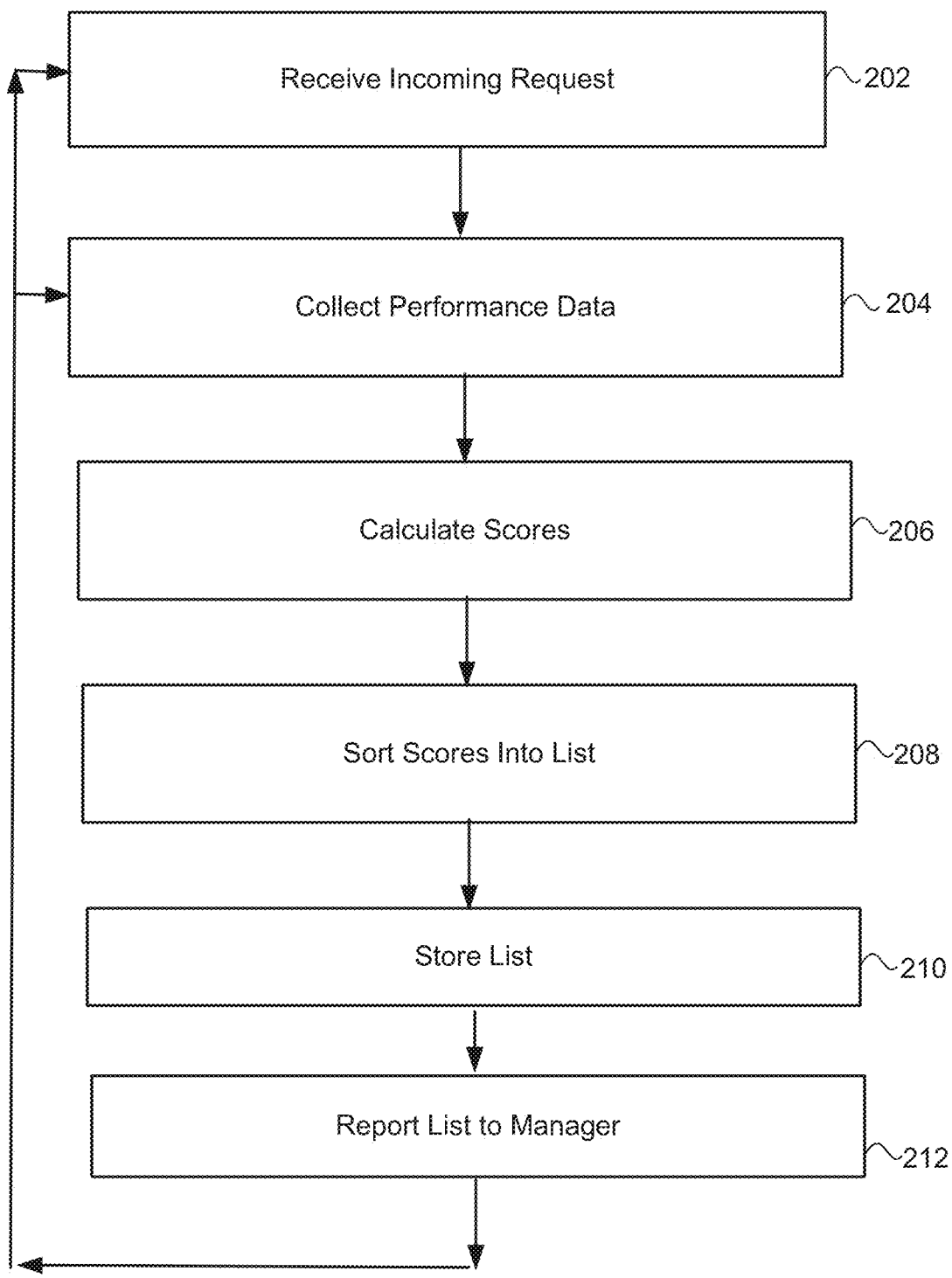
FIG. 2 shows a simplified flow diagram of a method according to an embodiment.

FIG. 2 is a flow diagram of a method 200 according to an embodiment. At 202, an incoming request is received, directed from a source to a first server group comprising a first plurality of servers.

At 204, performance data for each of the first plurality of servers is collected. This performance data may comprise, e.g., CPU usage, memory usage, and/or others.

At 206, first respective scores for each of the first plurality of servers are calculated from the performance data. This calculation may involve assigning weights to various types of the different performance data collected. For example, a first weight may be assigned to CPU usage performance data collected, and a second weight may be assigned to the memory usage performance data. Weight values are configurable for different systems by administrators according to resource requirements. In an example, for job servers processing time may not be of a great concern. However, for API servers memory consumption may be an important consideration.

At 208, the first respective scores are sorted into a first list. In one embodiment, a lower score may indicate an under-utilized server in the group, such that it would appear towards the bottom of the list as compared to other servers within the group that are currently being more heavily utilized. At 210, the first list is stored in a non-transitory computer-readable storage medium.

At 212, the list is reported to a manager. This reporting of the list, results in allocation of an idle server from a resource pool to the first server group, or allocation of a server of the first server group to the resource pool.

As shown in FIG. 2, this flow repeats itself. That is, performance data may be collected, scores may be re-calculated, and an updated list reported to the manager. The collection of performance data may be according to new incoming requests, or may be according to a time interval.

Further details regarding dynamic management of computing resources according to embodiments, are now provided in connection with the following example.

EXAMPLE

Figure 3:
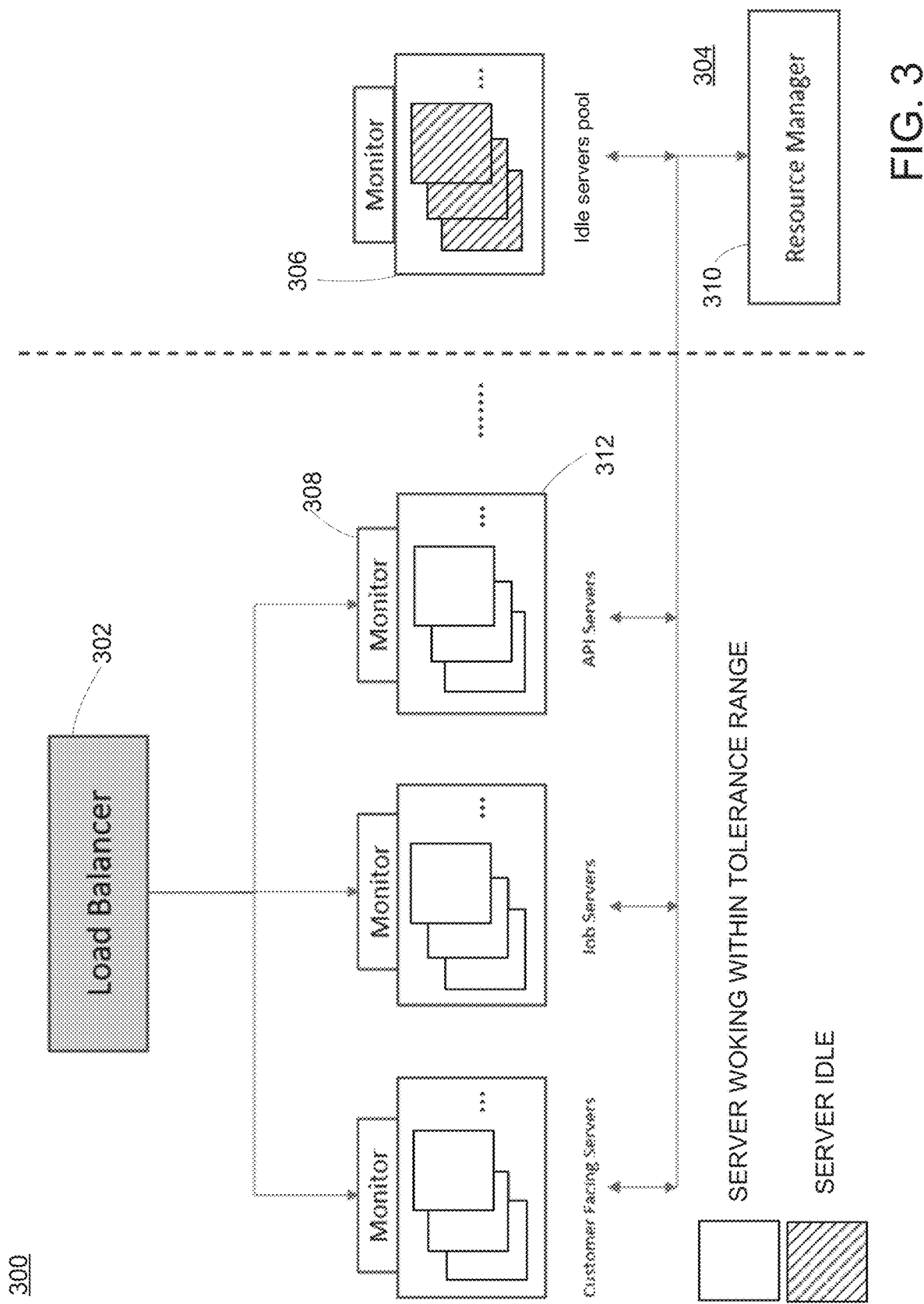
FIG. 3 shows a simplified architecture of a system according to an exemplary embodiment.

FIG. 3 shows a simplified view of a dynamic resource management architecture 300 according to an example. The load balancer component 302 employs a strategy to redirect requests to different server groups. For servers in each group, the request will be redirected according to a strategy such as round robin or sticky session.

The exemplary architecture of FIG. 3 further includes a light-weight resource management layer 304 and a resource pool 306. The resource pool is also referred to herein as an idle servers pool.

The role of the group monitor 308 element is to collect various performance data of servers within a group. Such performance data can reflect one or more of:
1) CPU Usage,
2) Memory Usage,
3) Queue Size,
4) IO,
5) Thread Pool, and
6) others.

Next, the group monitor component calculates a score of servers in the groups. In this particular exemplary embodiment, the score (S) of a server i may be calculated according to the following formula:

$$Si = Ci*Wc + Mi*Wm + Qi*Wq + Ii*Wi + Ti*Wt, \text{ where:}$$

$Ci$=CPU usage percentage,
$Mi$=Memory usage percentage,
$Qi$=Queue Size Usage percentage,
$Ii$=IO Usage percentage,
$Ti$=Thread Pool Usage, and
W=assigned weights.

An administrator has the discretion to establish and change the weight for each type of resource data according considerations such as personal experience, the role of the server group, and/or the resources consumed by the servers in the group. For example, based upon the specific role (e.g., customer facing, job, API) of the server group and demands expected to be placed thereon, a first weight may be assigned to CPU usage performance data collected, and a second weight may be assigned to the memory usage performance data. In one possible example, Wc+Wm+Wq+Wi+Wt=1.

Next, with the scores of each server in a group in hand, the monitor component then sorts the score and maintains a sequence of scores in a list. In one approach, this sequence of scores may be from high to low, e.g.: S1>S2>S3> . . . .

Next, the group monitor reports the score list to the resource manager 310. This reporting of the score list may occur according to a regular time interval configured by an administrator. For example, if administrator sets the reporting time interval at 5 minutes, then the group monitor will push the score sequence to the resource manager every 5 minutes.

In parallel to the above sequence of events, the load balancer may redirect a request to the server group. Then, the group monitor will select a server having a lower workload (e.g., the last server in the score list).

The group monitor will redirect the incoming request to that server. Then, the group monitor will recalculate the scores and re-sort the score list.

For example, if server i is the idlest server in the group, then the request will be redirected to the server i. If following recalculation the score Si is larger than S2, the new sorted sequence list is S1>Si>S2>S3> . . . .

The role of the resource manager in this exemplary embodiment, is now discussed. In particular, the resource manager monitors and throttles the servers in each group.

The resource manager may add servers from the idle servers pool to the group of which most of the servers are experiencing high work load (e.g., 90% or more of capacity). This high work load threshold of 90% is merely one possible example, and this value could be configurable over time depending upon the user preference (e.g., according to expected times of peak demand).

Conversely, the resource manager may remove the idlest servers to the idle server group from the group of which most of the servers are experiencing low work load (e.g., 20% or less). Again, this low work threshold value is exemplary, and could be configured.

In connection with one possible example, consider the API server group 312 of FIG. 3. Here, for API servers an administrator may set the high threshold value at 90% of capacity, and the low threshold value at 20% of capacity. A server within the API group operating at between 20%-90% of capacity, is considered to be within a tolerance range. As mentioned above, this tolerance range may be configurable.

Figure 4:
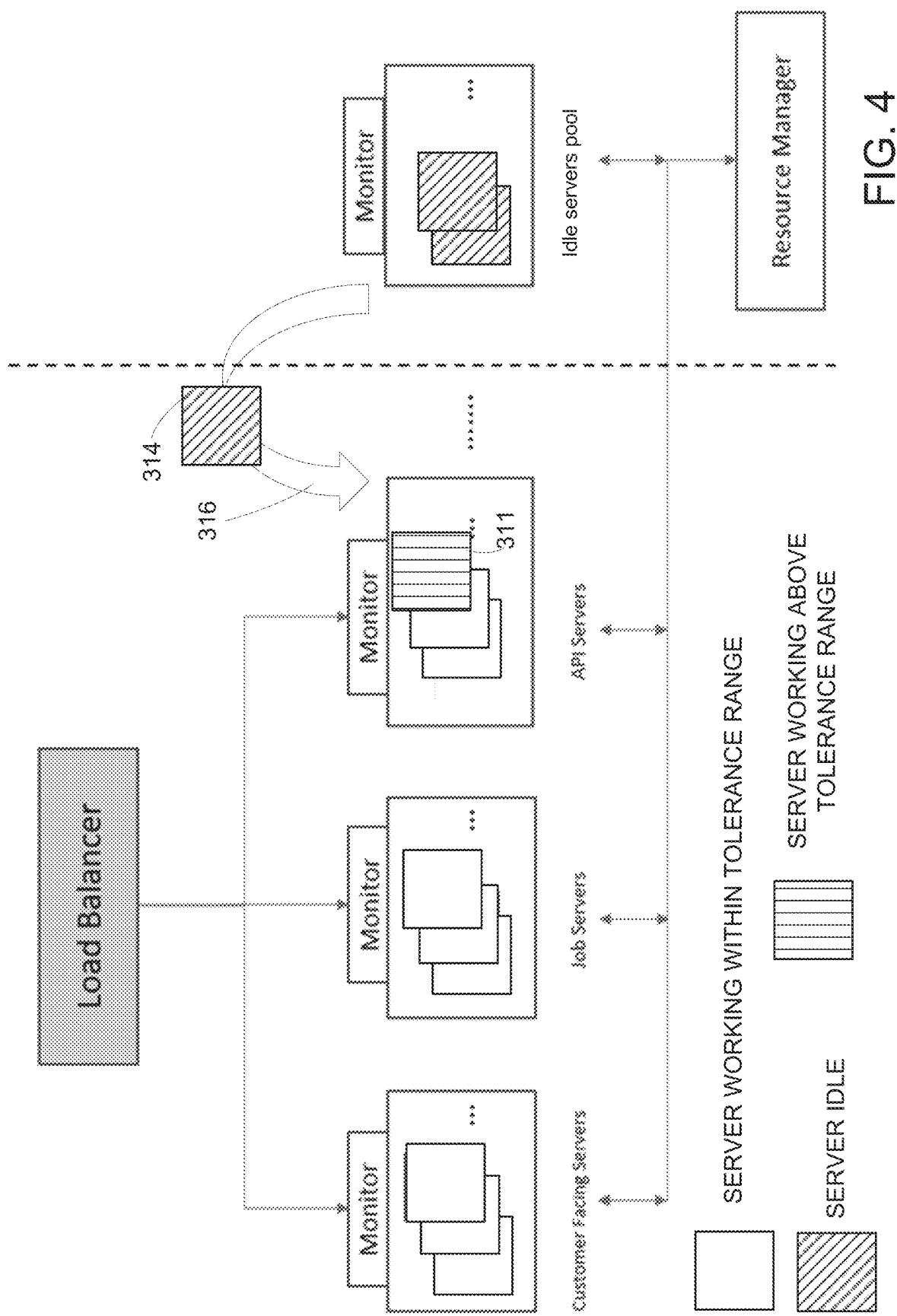
FIG. 4 shows a simplified architecture of the exemplary system of FIG. 3 where a server is allocated from the resource pool.

FIG. 4 shows the resource manager finding the scores of at least one API group server 311 reported by the group monitor, to be greater than 90%. Accordingly, a server 314 from the idle server pool will be allocated 316 to the API Servers Group.

It is noted that tolerance range may not just be based upon one server within a group, but on the group as a whole. Thus if workload of one server is more than (e.g., 90%), the balancer will not dispatch requests to that server, but to other servers of the group instead. Tolerance range for a group may also be configurable.

In some embodiments, the servers within a group may be configured to operate within a small deviation from each other within the tolerance range. The magnitude of this deviation may also be configurable.

Figure 5:
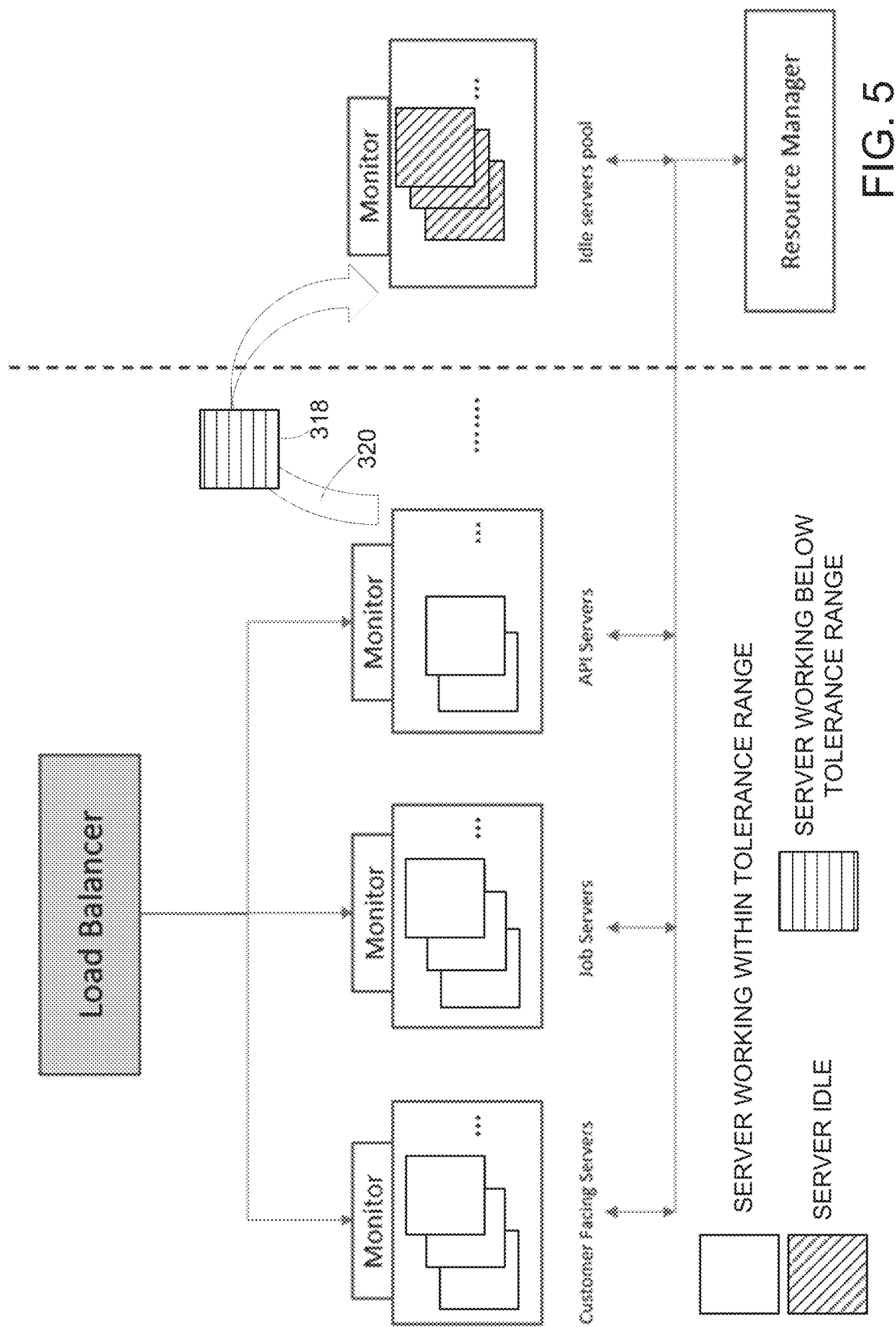
FIG. 5 shows a simplified architecture of the exemplary system of FIG. 3 where a server is allocated to the resource pool.

FIG. 5 shows the alternative situation where the resource manager finds all of the scores of the API group servers reported by the group monitor, to be less than 30%. Accordingly, one of the servers 318 will be allocated 320 to the idle servers pool.

It is noted that the threshold workload values used in determining the range for transferring to (vs. transferring from) the idle pool, need not necessarily be the same. Such different values may reflect, e.g., a desire that a cushion of resources to remain deployed and immediately available in the server group. Moreover, a different threshold value may be used to characterize servers that are operating at low capacity outside a tolerance range, versus those that are idle (but may have some amount of activity—e.g., to maintain their idle status).

Returning now to FIG. 1, there the particular embodiment is depicted with the engine responsible for implementing dynamic management of computing resources as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 6:
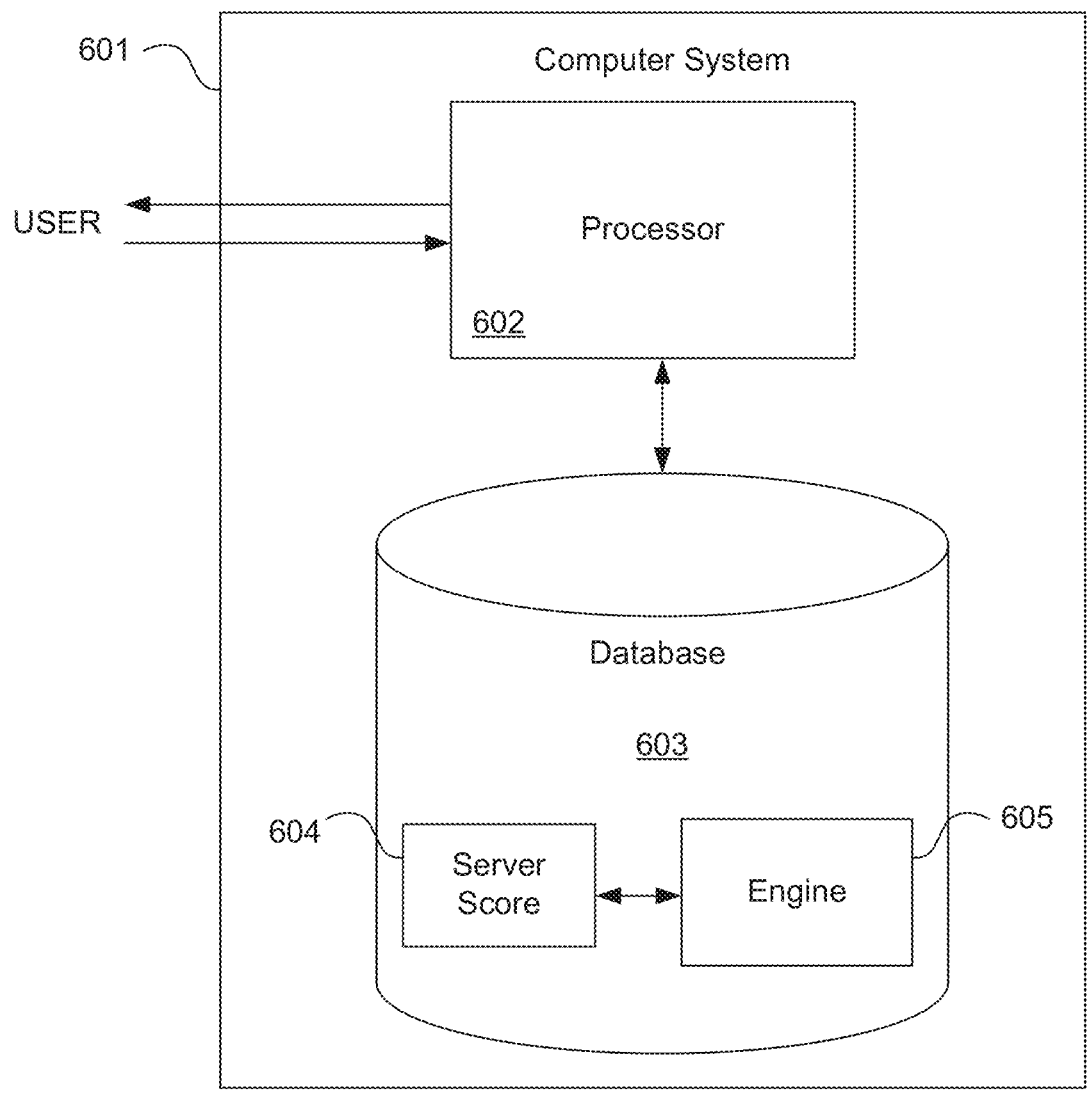
FIG. 6 illustrates hardware of a special purpose computing machine according to an embodiment configured to implement dynamic management of computing resources.

Thus FIG. 6 illustrates hardware of a special purpose computing machine configured to implement dynamic resource management according to an embodiment. In particular, computer system 601 comprises a processor 602 that is in electronic communication with a non-transitory computer-readable storage medium comprising a database 603. This computer-readable storage medium has stored thereon code 605 corresponding to an engine. Code 604 corresponds to a score of a server within a group. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
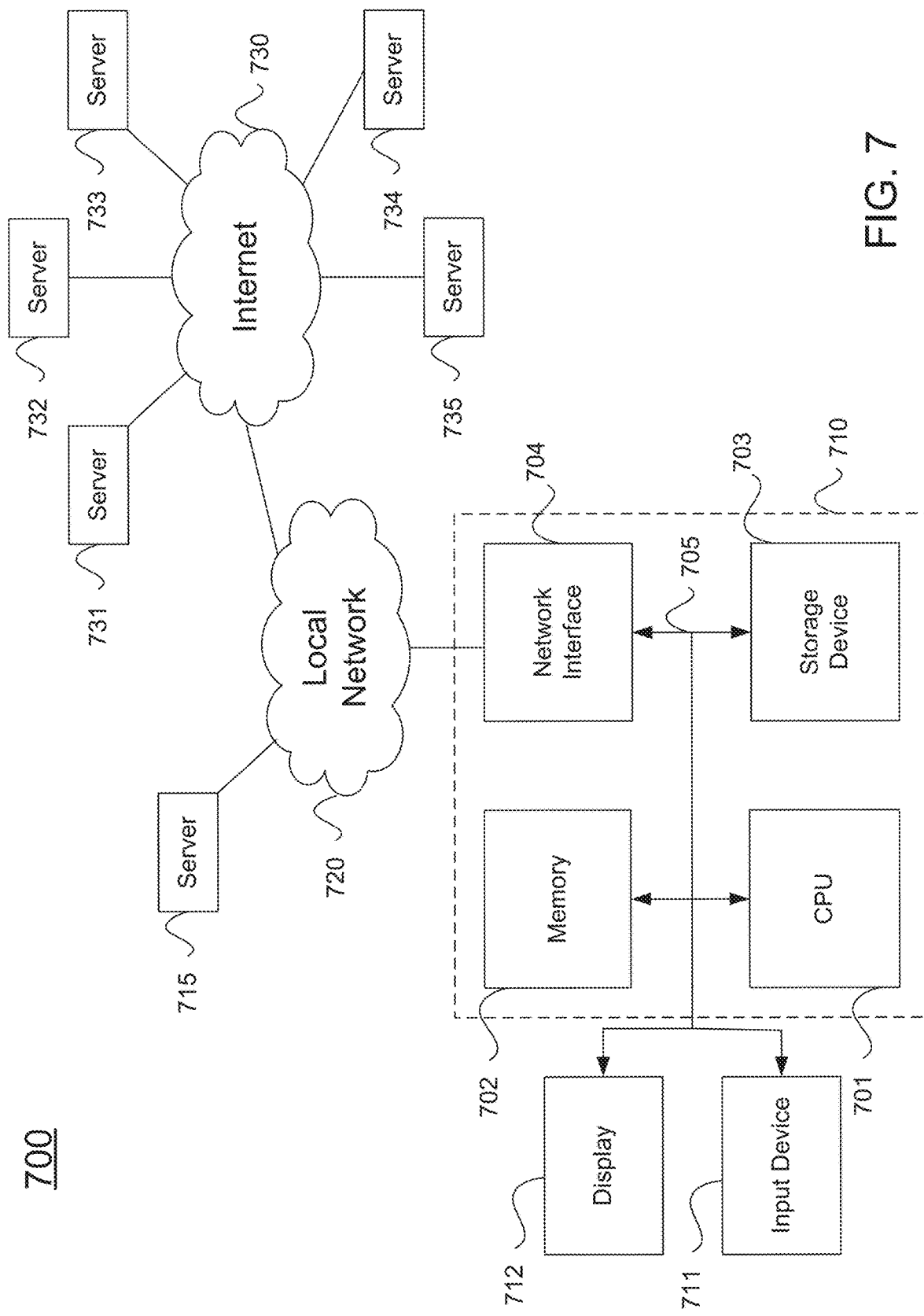
FIG. 7 illustrates an example computer system.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 605 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving a first incoming request directed from a source to a first server group comprising a first plurality of servers, the source comprising a load balancer configured to execute a strategy to route the request to the first server group;
collecting performance data for each of the first plurality of servers, the performance data comprising at least two different types of performance data selected from,
Central Processing Unit (CPU) usage,
memory usage,
queue size, and
thread pool usage;
calculating from the performance data, first respective scores for each of the first plurality of servers;
sorting the first respective scores into a first list;
storing the first list in a non-transitory computer-readable storage medium; and
reporting the first list to a manager to result in allocation of,
an idle server from a resource pool to the first server group, or
a server of the first server group to the resource pool.

2. A method as in claim 1 wherein the collecting of performance data is performed according to a collecting period.

3. A method as in claim 1 wherein the collecting of performance data is performed according to receipt of the first incoming request.

4. A method as in claim 1 wherein the calculating comprises assigning a first set of weights to the different types of performance data.

5. A method as in claim 4 wherein a sum of the first set of weights is 1.

6. A method as in claim 4 further comprising:
generating an administration report including the performance data;
communicating the administration report to an administrator; and
receiving input from the administrator to change the first set of weights.

7. A method as in claim 1 wherein reporting the list to the manager results in allocation of the idle server to the first server group, the method further comprising:
the first server group receiving a second incoming request directed from the source;
selecting the idle server to handle the second incoming request.

8. A method as in claim 1 wherein the calculating involves assigning a first set of weights to different types of performance data, the method further comprising:
receiving a second incoming request directed from the source to a second server group comprising a second plurality of servers;
collecting performance data for each of the second plurality of servers; and
calculating respective second scores for each of the second plurality of servers by assigning a second set of weights to the different types of performance data;
sorting the respective second scores into a second list;
storing the second list in the non-transitory computer-readable storage medium; and
reporting the second list to the manager.

9. A method as in claim 1 wherein:
the non-transitory computer readable storage medium comprises an in-memory database; and
the sorting is performed by an in-memory database engine of the in-memory database.

10. A non-transitory computer readable storage medium embodying a computer program for performing a method, said method comprising:
receiving a first incoming request directed from a source to a first server group comprising a first plurality of servers, the source comprising a load balancer configured to execute a strategy to route the request to the first server group;
collecting performance data for each of the first plurality of servers, the performance data comprising at least two different types of performance data selected from,
Central Processing Unit (CPU) usage,
memory usage,
queue size, and
thread pool usage;
calculating from the performance data, first respective scores for each of the first plurality of servers, the calculating comprising assigning a first set of weights to the different types of performance data;
sorting the first respective scores into a first list;
storing the first list in a non-transitory computer-readable storage medium; and
reporting the first list to a manager to result in allocation of,
an idle server from a resource pool to the first server group, or
a server of the first server group to the resource pool.

11. A non-transitory computer readable storage medium as in claim 10 wherein the collecting of performance data is performed according to a collecting period.

12. A non-transitory computer readable storage medium as in claim 10 wherein the collecting of performance data is performed according to receipt of the first incoming request.

13. A non-transitory computer readable storage medium as in claim 10 wherein reporting the list to the manager results in allocation of the idle server to the first server group, the method further comprising:
the first server group receiving a second incoming request directed from the source;
selecting the idle server to handle the second incoming request.

14. A non-transitory computer readable storage medium as in claim 10 wherein the calculating involves assigning a first set of weights to the at least two different types of performance data, the method further comprising:
receiving a second incoming request directed from the source to a second server group comprising a second plurality of servers;
collecting performance data for each of the second plurality of servers; and
calculating respective second scores for each of the second plurality of servers by assigning a second set of weights to the different types of performance data;
sorting the respective second scores into a second list;
storing the second list in the non-transitory computer-readable storage medium; and
reporting the second list to the manager.

15. A computer system comprising:
one or more processors;
a software program, executable on said computer system, the software program configured to cause an in-memory database engine of an in-memory database to:
receive a first incoming request directed from a source to a first server group comprising a first plurality of servers, the source comprising a load balancer configured to execute a strategy to route the request to the first server group;

collect performance data for each of the first plurality of servers, the performance data comprising at least two different types of performance data selected from, Central Processing Unit (CPU) usage, memory usage, queue size, and thread pool usage;

calculate from the performance data, first respective scores for each of the first plurality of servers;

sort the first respective scores into a first list;

store the first list in a non-transitory computer-readable storage medium; and report the first list to a manager to result in allocation of, an idle server from a resource pool to the first server group, or a server of the first server group to the resource pool.

16. A computer system as in claim 15 wherein the in-memory database engine collects the performance data according to a collection period.

17. A computer system as in claim 15 wherein the in-memory database engine collects the performance data according to receipt of the first incoming request.

18. A computer system as in claim 15 wherein the report of the list to the manager results in allocation of the idle server to the first server group, the in-memory database engine further configured to:

receive a second incoming request directed to the first server group from the source;

select the idle server to handle the second incoming request.

19. A computer system as in claim 15 wherein the in-memory database engine is configured to assign a first set of weights to the different types of performance data in order to calculate the first respective scores.

20. A computer system as in claim 15 wherein the first respective scores are calculated by assigning a first set of weights to the at least two different types of performance data, the in-memory database engine further configured to:

receive a second incoming request directed from the source to a second server group comprising a second plurality of servers;

collect performance data for each of the second plurality of servers; and calculate respective second scores for each of the second plurality of servers by assigning a second set of weights to the different types of performance data;

sort the respective second scores into a second list;

store the second list in the non-transitory computer-readable storage medium; and report the second list to the manager.

* * * * *